United States Patent
Yanagawa et al.

(10) Patent No.: US 12,468,104 B2
(45) Date of Patent: Nov. 11, 2025

(54) OPTICAL CABLE

(71) Applicant: SUMITOMO ELECTRIC INDUSTRIES, LTD., Osaka (JP)

(72) Inventors: Nayu Yanagawa, Osaka (JP); Ryota Fukumoto, Osaka (JP); Taro Fujita, Osaka (JP); Fumiaki Sato, Osaka (JP); Toyoaki Kimura, Osaka (JP); Yohei Suzuki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 326 days.

(21) Appl. No.: 18/455,712

(22) Filed: Aug. 25, 2023

(65) Prior Publication Data

US 2024/0094493 A1 Mar. 21, 2024

(30) Foreign Application Priority Data

Sep. 21, 2022 (JP) .................................. 2022-150602

(51) Int. Cl.
*G02B 6/44* (2006.01)
(52) U.S. Cl.
CPC .................................. *G02B 6/4438* (2013.01)
(58) Field of Classification Search
CPC .................................................. G02B 6/4438
See application file for complete search history.

(56) References Cited

U.S. PATENT DOCUMENTS

| | | | |
|---|---|---|---|
| 2005/0194578 A1* | 9/2005 | Morris | G02B 6/4459 |
| | | | 254/134.3 FT |
| 2011/0110635 A1 | 5/2011 | Toge et al. | |
| 2022/0365300 A1* | 11/2022 | Sato | G02B 6/4435 |

FOREIGN PATENT DOCUMENTS

JP 2010-008923 A 1/2010

\* cited by examiner

*Primary Examiner* — Uyen Chau N Le
*Assistant Examiner* — Hoang Q Tran
(74) *Attorney, Agent, or Firm* — MCDONALD HOPKINS LLC

(57) ABSTRACT

An optical cable according to an embodiment of the present disclosure is an optical cable for installation in a microduct, the optical cable including one or more optical-fiber core wires, and a sheath layer covering an outer peripheral side of the one or more optical-fiber core wires. The sheath layer has a density of 2.0 g/cm³ or less. The sheath layer contains an olefin-based resin, a silicone, and a non-halogen flame retardant. A mass ratio of the non-halogen flame retardant to the olefin-based resin is 0.90 to 2.00. A mass ratio of the silicone to the olefin-based resin is 0.005 to 0.100. The olefin-based resin contains a polyethylene, and an ethylene-vinyl acetate copolymer or an ethylene-ethyl acrylate copolymer. The silicone has a weight-average molecular weight of 50,000 to 1,000,000.

6 Claims, 1 Drawing Sheet

OPTICAL CABLE

CROSS REFERENCES TO RELATED APPLICATIONS

The present disclosure contains subject matter related to Japanese Patent Application No. 2022-150602 filed in the Japan Patent Office on Sep. 21, 2022, the entire contents of which are incorporated herein by reference.

BACKGROUND OF THE INVENTION

1. Technical Field

The present disclosure relates to an optical cable.

2. Background

The construction of optical networks is progressing in order to support two-way communication and high-volume communication in addition to an increase in the speed of communication and an increase in the volume of information due to the widespread use of information and communication technologies such as the Internet. In the optical networks, Fiber To The Home (FTTH) has started in which a communications carrier and each home are directly connected to each other through an optical fiber to provide high-speed communication services, and the volume of communication has increased each year. Accordingly, a decrease in the diameter and an increase in the density of an optical cable have been desired. For example, in the related art, the structure of a slot-less optical cable is disclosed (refer to Japanese Unexamined Patent Application Publication No. 2010-8923).

SUMMARY

An optical cable according to an embodiment of the present disclosure is an optical cable for installation in a microduct, the optical cable including one or more optical-fiber core wires, and a sheath layer covering an outer peripheral side of the one or more optical-fiber core wires. The sheath layer has a density of 2.0 g/cm$^3$ or less. The sheath layer contains an olefin-based resin, a silicone, and a non-halogen flame retardant. A mass ratio of the non-halogen flame retardant to the olefin-based resin is 0.90 to 2.00. A mass ratio of the silicone to the olefin-based resin is 0.005 to 0.100. The olefin-based resin contains a polyethylene, and an ethylene-vinyl acetate copolymer or an ethylene-ethyl acrylate copolymer. The silicone has a weight-average molecular weight of 50,000 to 1,000,000.

DETAILED DESCRIPTION

Figure 1:
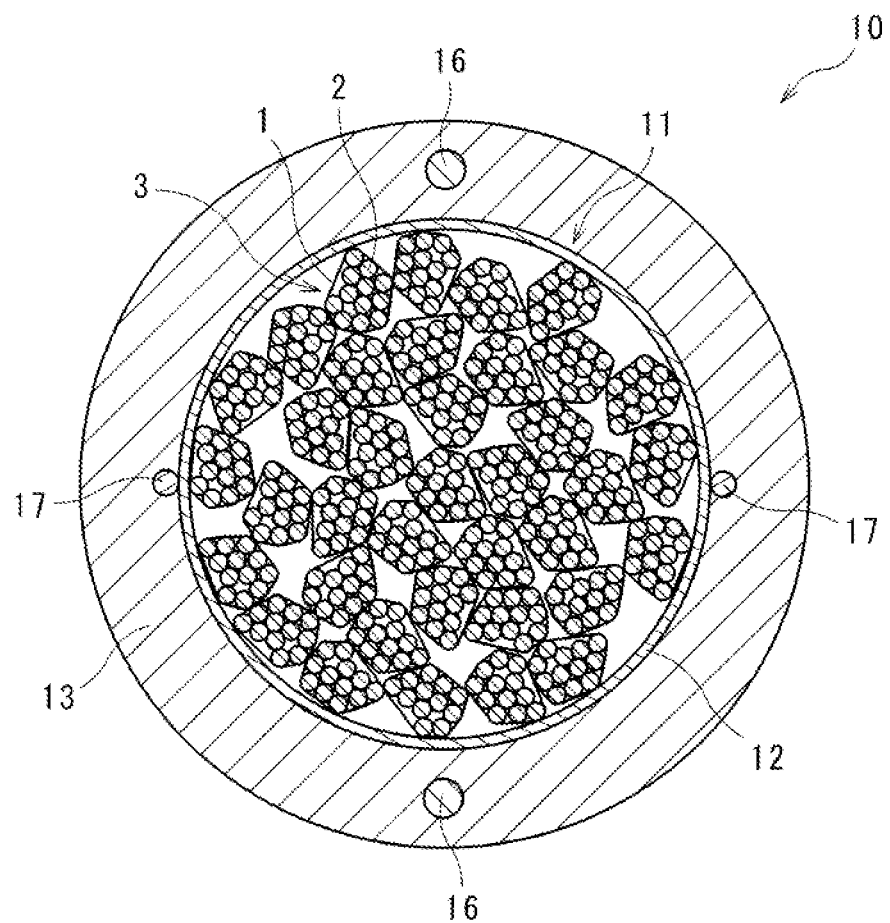
FIG. 1 is a schematic sectional view of an optical cable according to an embodiment of the present disclosure.

A construction method in which a cable is fed, by air blowing, into a microduct that is a tubular duct with a small diameter is referred to as a microduct system construction method. The microduct system construction method enables rapid additional installation of optical fibers necessary for the growth of the optical networks as described above and is a very effective method of realizing FTTH. Thus, it is desirable to provide an optical cable suitable for the application of the microduct system construction method, in particular, in the access/drop area.

The aforementioned slot-less optical cable is easily reduced in weight and thus is suitable for an air-blown optical cable (also referred to as a microduct cable). Such an air-blown optical cable is caused to pass into a small-diameter duct while air at a predetermined pressure is supplied into the duct and the cable is pushed. Thus, it is desirable to make it easy for the optical cable to pass through the duct. In particular, since the installation cost can be further reduced with an increase in the blowing distance, an air-blowing property for a long distance is desired. On the other hand, when an optical cable is installed indoors, a sheath layer is desired to have higher flame retardancy.

The present disclosure has been made in view of the circumstances described above, and an object of the present disclosure is to provide an optical cable having high flame retardancy and a good air-blowing performance into a microduct.

The optical cable according to an embodiment of the present disclosure has high flame retardancy and a good air-blowing performance into a microduct.

First, embodiments of the present disclosure will be listed and described.

An optical cable according to an embodiment of the present disclosure is an optical cable for installation in a microduct, the optical cable including one or more optical-fiber core wires, and a sheath layer covering an outer peripheral side of the one or more optical-fiber core wires. The sheath layer has a density of 2.0 g/cm$^3$ or less. The sheath layer contains an olefin-based resin, a silicone, and a non-halogen flame retardant. A mass ratio of the non-halogen flame retardant to the olefin-based resin is 0.90 to 2.00. A mass ratio of the silicone to the olefin-based resin is 0.005 to 0.100. The olefin-based resin contains a polyethylene, and an ethylene-vinyl acetate copolymer or an ethylene-ethyl acrylate copolymer. The silicone has a weight-average molecular weight of 50,000 to 1,000,000.

Since the sheath layer of the optical cable used for installation in a microduct has a density of 2.0 g/cm$^3$ or less, the optical cable can be reduced in weight. Since the mass ratio of the non-halogen flame retardant to the olefin-based resin is 0.90 to 2.00, good flame retardancy and good compatibility with the olefin-based resin can be provided. Moreover, since the mass ratio of the silicone to the olefin-based resin is 0.005 to 0.100, the surface of the sheath layer has good slidability, and thus the blowing property during air blowing is improved, and good compatibility with the olefin-based resin can be provided. In addition, since the olefin-based resin contains a polyethylene, the optical cable can have a good hardness. As a result, the optical cable is easily fed during air-blowing into a microduct. Since the olefin-based resin contains an ethylene-vinyl acetate copolymer or an ethylene-ethyl acrylate copolymer, compatibility with the non-halogen flame retardant can be improved to improve the tensile elongation of the sheath layer. Moreover, since the silicone has a weight-average molecular weight of 50,000 to 1,000,000, slidability of the surface of the sheath layer and the air-blowing property during air blowing are improved. Accordingly, the optical cable has high flame retardancy and can realize a good air-blowing performance into a microduct while improving the hardness of the sheath layer, slidability of the surface of the sheath layer, and reduction in weight of the sheath layer.

The "weight-average molecular weight" is a value measured by gel permeation chromatography (GPC) in terms of standard polystyrene. Specifically, the average molecular weight is determined under the following conditions using tetrahydrofuran as a solvent, with a GPC system (SC-8010 manufactured by Tosoh Corporation), using a calibration curve prepared with commercially available standard polystyrene samples.

Flow rate: 1.0 mL/min
Set temperature: 40° C.
Column structure: "TSK guardcolumn MP (XL)" manufactured by Tosoh Corporation, 6.0 mm ID×4.0 cm, 1 column, and "TSK-GELMULTIPOREHXL-M" manufactured by Tosoh Corporation, 7.8 mm ID×30.0 cm (theoretical plate number: 16,000), 2 columns, 3 column in total (theoretical plate number as a whole: 32,000)
Amount of sample injected: 100 μL (concentration of sample solution: 1 mg/mL)
Liquid feeding pressure: 39 kg/cm$^2$
Detector: Refractive index (RI) detector A content of the polyethylene in the olefin-based resin is preferably 30% by mass to 60% by mass, a content of the ethylene-vinyl acetate copolymer or the ethylene-ethyl acrylate copolymer in the olefin-based resin is preferably 30% by mass to 60% by mass, and the polyethylene preferably has a density of 0.92 g/cm$^3$ or more. When the content of the polyethylene in the olefin-based resin is 30% by mass to 60% by mass, the content of the ethylene-vinyl acetate copolymer or the ethylene-ethyl acrylate copolymer in the olefin-based resin is 30% by mass to 60% by mass, and the polyethylene has a density of 0.92 g/cm$^3$ or more, a better hardness is obtained. As a result, the optical cable is more easily fed during air-blowing into a microduct.

The sheath layer preferably has an elastic modulus of 250 MPa to 2,000 MPa at 25° C. When the sheath layer has an elastic modulus of 250 MPa to 2,000 MPa at 25° C., the sheath layer can have a hardness in a better range, and thus the optical cable can have a further improved air-blowing performance into a microduct. The "elastic modulus" is a value measured in accordance with the test method of dynamic mechanical properties described in JIS-K7244-4 (1999) and is a value of a storage elastic modulus measured with a viscoelasticity measuring device (for example, "DVA-220" manufactured by IT Keisoku Seigyo Co., Ltd.) in a tensile mode, in a temperature range of from −60° C. to 80° C., at a temperature increasing rate of 5° C./min, at a frequency of 10 Hz, and at a strain of 0.05%.

The sheath layer preferably has an elastic modulus of 30 MPa or more at 70° C. When the sheath layer has an elastic modulus of 30 MPa or more at 70° C., a deformation of the cable can be prevented during the storage at high temperature as in a warehouse in summer.

The polyethylene is preferably a high-density polyethylene. When the polyethylene is a high-density polyethylene, the hardness of the sheath layer can be further increased, and thus the optical cable can have a further improved air-blowing performance into a microduct.

The olefin-based resin preferably further contains an acid-modified polyethylene, and a content of the acid-modified polyethylene in the olefin-based resin is preferably 5% by mass to 20% by mass. When the olefin-based resin further contains an acid-modified polyethylene, and the content of the acid-modified polyethylene in the olefin-based resin is 5% by mass to 20% by mass, compatibility between the olefin-based resin and the non-halogen flame retardant can be further improved.

An optical cable according to an embodiment of the present disclosure will be described in detail below with reference to the drawings.

Optical Cable

The optical cable is an optical cable for installation in a duct and is typically an optical cable in which 1,000 optical-fiber core wires or less are loaded. The optical cable is installed mainly by air blowing in underground piping called a microduct. The optical cable includes one or more optical-fiber core wires and a sheath layer covering an outer peripheral side of the one or more optical-fiber core wires.

FIG. 1 is a schematic sectional view of an optical cable according to an embodiment of the present disclosure. As illustrated in FIG. 1, an optical cable 10 is a slot-less optical cable and includes, for example, when viewed in cross section, a circular assembled core 11, a sheath layer 13 covering the assembled core 11, and tension members 16 and ripcords 17 embedded in the sheath layer 13.

The assembled core 11 of the optical cable 10 contains a plurality of fiber ribbons 3 that are gathered with a water swellable tape 12 in a circular shape when viewed in cross section. Each of the fiber ribbons 3 has, for example, twelve optical-fiber core wires 2. The assembled core 11 may contain, in addition to the fiber ribbons 3, a plurality of optical-fiber core wires in a bundled state, the optical-fiber core wires each being a single-core optical-fiber core wire 2.

The outer surface of the water swellable tape 12 is covered with the sheath layer 13. In the sheath layer 13, for example, two tension members (also referred to as tensile strength members) 16 for maintaining the strength in the longitudinal direction and, for example, two ripcords 17 for ripping the sheath layer 13 in the longitudinal direction of the cable are embedded so as to extend longitudinally when the sheath layer 13 is extruded.

Fiber Ribbon

The fiber ribbons 3 are each formed of, for example, a bundle of a plurality of optical-fiber core wires 2 covered with a tape 1 composed of a polyester or the like. Publicly known optical fibers can be used as the optical-fiber core wires 2. A plurality of fiber ribbons 3 may be further intertwined and contained in this state. In order to mount the fiber ribbons 3 in the assembled core 11 at a high density, the fiber ribbons 3 may be, for example, intermittently connected fiber ribbons. The plurality of fiber ribbons 3 in the assembled state may be bundled with, for example, a bundle material or may be bundled with, for example, a bundle material for each of the units. In this embodiment, the fiber ribbons 3 are contained in the assembled core 11. Alternatively, the optical-fiber core wires 2 may be contained in the assembled core 11 in the form of a single-core optical-fiber core wire 2 instead of the form of a fiber ribbon 3.

Water Swellable Tape

The water swellable tape 12 is wound around the entirety of the plurality of fiber ribbons 3 so as to extend longitudinally or spirally, for example. The water swellable tape 12 is produced by, for example, causing a water-absorbing powder to adhere to a base cloth composed of a polyester or the like to perform water-absorbent finishing.

Tension Member

The optical cable 10 includes the tension members 16 that bear a tension in order to prevent elongation due to the self-weight during installation. The tension members 16 are disposed in the sheath layer 13 in the longitudinal direction of the optical cable 10 so as to be symmetric with respect to the center of the optical cable 10. The tension members 16 are formed of wire materials having resistance to tension and compression, for example, steel wires or fiber reinforced plastics (FRP). The tension members 16 are each formed to have a circular shape in sectional view.

Ripcord

The ripcords 17 are cords for ripping the sheath layer 13 and are embedded in the sheath layer 13 in the longitudinal direction of the optical cable 10. In this example, two ripcords 17 are provided. The two ripcords 17 are disposed in the sheath layer 13 at substantially intermediate positions between adjacent tension members 16 so as to face each other. By pulling out the ripcords 17, the sheath layer 13 can be ripped in the longitudinal direction to take out the fiber ribbons 3. The ripcords 17 are formed of, for example, a plastic material having a high tensile strength, such as a nylon or a polyester.

Sheath Layer

The sheath layer 13 is a resin layer covering the outer peripheral side of the optical-fiber core wires 2. The sheath layer 13 contains an olefin-based resin, a silicone, and a non-halogen flame retardant. The phrase "covering the outer peripheral side" as used herein means that the outer peripheral surfaces of the optical-fiber core wires 2 may be directly covered or may be indirectly covered.

The upper limit of the density of the sheath layer 13 is 2.0 $g/cm^3$ and may be 1.8 $g/cm^3$. When the sheath layer 13 has a density of 2.0 $g/cm^3$ or less, a reduction in weight can be achieved, and thus the blowing distance can be increased in a microduct.

The lower limit of the elastic modulus of the sheath layer 13 at 25° C. is preferably 250 MPa and may be 300 MPa. On the other hand, the upper limit of the elastic modulus of the sheath layer 13 at 25° C. is preferably 2,000 MPa and may be 1,500 MPa. When the elastic modulus of the sheath layer 13 at 25° C. is 250 MPa or more, the sheath layer 13 can have a sufficient hardness to improve the air-blowing performance into a microduct. On the other hand, when the elastic modulus of the sheath layer 13 at 25° C. is 2,000 MPa or less, flexibility at room temperature is good, and cracking of the jacket during installation can be reduced.

The lower limit of the elastic modulus of the sheath layer 13 at 70° C. is preferably 30 MPa and may be 50 MPa. When the elastic modulus of the sheath layer 13 at 70° C. is 30 MPa or more, a deformation of the optical cable can be reduced in a high-temperature environment, for example, in summer.

Olefin-Based Resin

The olefin-based resin contains a polyethylene, and an ethylene-vinyl acetate copolymer or an ethylene-ethyl acrylate copolymer.

Since the olefin-based resin contains a polyethylene, a good hardness is obtained. As a result, the optical cable is easily fed during air-blowing into a microduct. Examples of the polyethylene include high-density polyethylenes (HDPE), low-density polyethylenes (LDPE), and linear low-density polyethylenes (LLDPE). The polyethylene is preferably a high-density polyethylene. When the polyethylene is a high-density polyethylene, the hardness of the sheath layer 13 can be further increased, and thus the optical cable easily passes through a microduct.

The lower limit of the density of the polyethylene is preferably 0.92 $g/cm^3$ and may be 0.93 $g/cm^3$. The upper limit of the density of the polyethylene is preferably 0.96 $g/cm^3$ and may be 0.95 $g/cm^3$. When the sheath layer 13 has a density of 0.92 $g/cm^3$ or more, the sheath layer 13 can have a sufficient hardness to improve the air-blowing performance into a microduct. On the other hand, when the sheath layer 13 has a density of 0.96 $g/cm^3$ or less, the sheath layer 13 can be reduced in weight to improve the air-blowing performance into a microduct. Note that low-density polyethylenes have a density of less than 0.942 $g/cm^3$, and high-density polyethylenes have a density of 0.942 $g/cm^3$ or more.

The lower limit of the content of the polyethylene in the olefin-based resin is preferably 30% by mass and may be 35% by mass. On the other hand, the upper limit of the content of the polyethylene in the olefin-based resin is preferably 60% by mass. When the polyethylene content is 30% by mass or more, the sheath layer 13 can have a sufficient hardness to improve the air-blowing performance into a microduct. On the other hand, when the polyethylene content is 60% by mass or less, the elastic modulus can be increased to improve the air-blowing performance into a microduct.

Since the olefin-based resin contains an ethylene-vinyl acetate copolymer or an ethylene-ethyl acrylate copolymer, compatibility with the non-halogen flame retardant can be improved to improve the tensile elongation of the sheath layer 13.

The content of the copolymer or the ethylene-ethyl acrylate (EEA) copolymer in the olefin-based resin is preferably 30% by mass to 60% by mass and may be 40% by mass to 60% by mass. When the content of the ethylene-vinyl acetate copolymer or the ethylene-ethyl acrylate copolymer is 30% by mass or more, good compatibility between the olefin-based resin and the non-halogen flame retardant can be achieved. On the other hand, when the content of the ethylene-vinyl acetate copolymer or the ethylene-ethyl acrylate copolymer is 60% by mass or less, a reduction in the elastic modulus of the sheath layer 13 at 70° C. can be suppressed to reduce a deformation of the optical cable during the storage at high temperature as in a warehouse in summer.

The olefin-based resin may further contain an acid-modified polyethylene. The "acid-modified polyethylene" refers to a polyethylene having an acidic functional group in a side chain, a polyethylene in which an acidic functional group is incorporated in the main chain, or a polyethylene which has an acidic functional group in a side chain and in which an acidic functional group is incorporated in the main chain.

Examples of the acid-modified polyethylene include acid-modified low-density polyethylenes and acid-modified very low-density polyethylenes.

An acid used for acid modification is not limited as long as the effects of the present disclosure are not impaired and may be, for example, an unsaturated carboxylic acid or a derivative thereof. Examples of the unsaturated carboxylic acid include acrylic acid, methacrylic acid, maleic acid, itaconic acid, and fumaric acid. Examples of a derivative of the unsaturated carboxylic acid include maleic acid monoesters, maleic anhydride, itaconic acid monoesters, itaconic anhydride, fumaric acid monoesters, and fumaric anhydride. Of these, derivatives of unsaturated carboxylic acids are preferred, and maleic anhydride is more preferred from the viewpoint that compatibility between the olefin-based resin and the non-halogen flame retardant can be further improved.

The acid-modified polyethylene is preferably maleic anhydride-modified very low-density polyethylenes and maleic anhydride-modified linear low-density polyethylenes. Of these, maleic anhydride-modified very low-density polyethylenes are more preferred in view of flexibility of the resin.

The lower limit of the content of the acid-modified polyethylene in the olefin-based resin is preferably 5% by mass and may be 8% by mass. On the other hand, the upper limit of the content of the acid-modified polyethylene in the olefin-based resin is preferably 20% by mass and may be 15% by mass. When the acid-modified polyethylene content is 5% by mass or more, compatibility between the olefin-based resin and the non-halogen flame retardant can be improved to obtain a sufficient tensile elongation. This can enhance the effect of reducing cracking of the jacket during installation into a microduct. On the other hand, when the acid-modified polyethylene content is 20% by mass or less, a sufficient elastic modulus can be obtained to improve the air-blowing performance into a microduct.

Silicone

The sheath layer 13 contains a silicone as a lubricant. When the sheath layer 13 contains a silicone, the coefficient of kinetic friction of the sheath layer 13 can be lowered to improve slidability. Consequently, when the optical cable 10 is blown with air in a microduct, the friction between the sheath layer 13 and the microduct can be reduced to increase the blowing distance.

The lower limit of the weight-average molecular weight of the silicone is 50,000 and may be 100,000. On the other hand, the upper limit of the weight-average molecular weight of the silicone is 1,000,000 and may be 950,000. If the weight-average molecular weight of the silicone is less than 50,000, extrudability of a material of the sheath layer 13 (a resin composition for forming the sheath layer) may decrease. On the other hand, if the weight-average molecular weight of the silicone exceeds 1,000,000, compatibility with the olefin-based resin may decrease.

The lower limit of the mass ratio of the silicone to the olefin-based resin is 0.005 and may be 0.008. On the other hand, the upper limit of the mass ratio of the silicone to the olefin-based resin is 0.100 and may be 0.080. If the mass ratio of the silicone to the olefin-based resin is less than 0.005, the surface of the sheath layer 13 does not have sufficient slidability, and the air-blowing performance into a microduct may decrease. On the other hand, if the mass ratio of the silicone to the olefin-based resin exceeds 0.100, extrudability of the material of the sheath layer 13 (the resin composition for forming the sheath layer) may decrease.

Non-Halogen Flame Retardant

The sheath layer 13 contains a non-halogen flame retardant. The non-halogen flame retardant is a compound containing no halogen element, such as bromine or chlorine, in its chemical structure. Examples of the non-halogen flame retardant include inorganic flame retardants, nitrogen-based flame retardants, organophosphorus flame retardants, and silicone-based flame retardants. These flame retardants may be used alone or in combination of two or more thereof.

Examples of the inorganic flame retardants include magnesium hydroxide, aluminum hydroxide, potassium hydroxide, zirconium hydroxide, huntite, hydromagnesite, antimony trioxide, calcium phosphate, zirconium oxide, titanium oxide, zinc oxide, magnesium oxide, tin oxide, magnesium carbonate, calcium carbonate, barium sulfate, borax, barium borate, barium metaborate, zinc borate, zinc metaborate, anhydrous alumina, molybdenum disulfide, clay, red phosphorus, diatomaceous earth, kaolinite, montmorillonite, hydrotalcite, talc, silica, white carbon, zeolite, asbestos, and lithopone.

Examples of the nitrogen-based flame retardants include melamine derivatives such as melamine cyanurate, melamine, succinoguanamine, ethylene dimelamine, triguanamine, acetoguanamine, guanylmelamine sulfate, melem sulfate, and melam sulfate.

Examples of the organophosphorus flame retardants include tris(chloroethyl) phosphate, tris(monochloropropyl) phosphate, tris(dichloropropyl)phosphate, triallyl phosphate, tris(3-hydroxypropyl)phosphine oxide, glycidyl-α-methyl-β-di(butoxyphosphinyl)propionate, dibutylhydroxymethyl phosphonate, (butoxy)phosphinyl propylamide, dimethyl phosphonate, ammonium polyphosphate, amine phosphates such as ethylenediamine phosphate, and amine phosphonates.

Examples of the silicone-based flame retardants include silicone resins, polydimethyl siloxane, and silicon powders.

The lower limit of the mass ratio of the non-halogen flame retardant to the olefin-based resin is 0.90 and may be 1.00. On the other hand, the upper limit of the mass ratio of the non-halogen flame retardant to the olefin-based resin is 2.00 and may be 1.80. If the mass ratio of the non-halogen flame retardant to the olefin-based resin is less than 0.90, sufficient flame retardancy of the sheath layer 13 may not be obtained. On the other hand, if the mass ratio of the non-halogen flame retardant to the olefin-based resin exceeds 2.00, compatibility with the olefin-based resin may decrease, resulting in a decrease in the tensile elongation, and the sheath layer 13 may be unlikely to be reduced in weight.

Method of Manufacturing Optical Cable

Next, an example of a method of manufacturing the optical cable will be described. The method of manufacturing the optical cable includes, for example, a step of preparing a fiber ribbon; and a step of covering an outer peripheral side of the fiber ribbon with a sheath layer.

In the step of preparing a fiber ribbon (fiber ribbon preparation step), a plurality of optical-fiber core wires are wrapped with a tape to assemble the optical-fiber core wires.

In the step of covering with a sheath layer, an outer peripheral side of one fiber ribbon or an assembly of a plurality of fiber ribbons obtained in the fiber ribbon preparation step is covered with a sheath layer. An example of the covering method used is extrusion molding in which a resin composition for forming a sheath layer is extruded onto the outer peripheral side of one fiber ribbon or an assembly of a plurality of fiber ribbons.

The above optical cable has high flame retardancy. Furthermore, the optical cable has a good air-blowing performance into a microduct because the sheath layer is reduced in weight, and the hardness of the sheath layer and the slidability of the surface of the sheath layer are adjusted to satisfactory ranges.

Other Embodiments

It is to be understood that the embodiments disclosed herein are only illustrative and non-restrictive in all respects. The scope of the present disclosure is not limited to the configurations of the embodiments but is defined by the appended claims, and is intended to cover meanings equivalent to the claims and all modifications within the scope.

EXAMPLES

Hereinafter, the present disclosure will be more specifically described by way of Examples. However, the present disclosure is not limited to the following Examples.

Optical Cable Nos. 1 to 25

Preparation of Sheath Layer

Resin compositions for forming sheath layers were prepared at blend ratios shown in Tables 1 and 2, and tubular sheath layers of Nos. 1 to 25 having an average outer diameter of 12 mm and an average thickness of 1.2 mm were formed by extruding the resin compositions for forming sheath layers. The compositions and densities of the resin compositions for forming sheath layers are shown in Tables 1 and 2. The symbol "-" indicates that the corresponding component is not used.

Olefin-Based Resin

In Tables 1 and 2, olefin-based resin used are as follows. Hereinafter, EA represents ethyl acrylate, and VA represents vinyl acetate.

(1) EEA (ethylene-ethyl acrylate copolymer)
"NUC-6520" manufactured by ENEOS NUC Corporation
Content of EA (ethyl acrylate) unit: 18% by mass, Density: 0.94 g/cm$^3$ (2) EVA (ethylene-vinyl acetate copolymer)
"ULTRASEN 634" manufactured by Tosoh Corporation
Content of VA (vinyl acetate) unit: 35% by mass, Density: 0.949 g/cm$^3$ (3) HDPE (high-density polyethylene)
"Nipolon Hard 6530" manufactured by Tosoh Corporation
Density: 0.95 g/cm$^3$ (4) LDPE (low-density polyethylene)
"NUC8010" manufactured by ENEOS NUC Corporation
Density: 0.93 g/cm$^3$ (5) Acid-modified PE (Acid-modified polyethylene)
"ADMER LB548" manufactured by Mitsui Chemicals, Inc.
Maleic anhydride-modified low-density polyethylene
Density: 0.912 g/cm$^3$ Non-Halogen Flame Retardant (1) Surface-treated magnesium hydroxide: "KISUMA 5L" manufactured by Kyowa Chemical Industry Co., Ltd.
(2) Aluminum hydroxide: "HIGILITE H42M" manufactured by SHOWA DENKO K.K.
(3) Melamine cyanurate: "MC-4000" manufactured by Nissan Chemical Corporation Lubricant (1) Low-molecular-weight silicone 1: Weight-average molecular weight 40,000
(2) Low-molecular-weight silicone 2: Weight-average molecular weight 70,000
(3) High-molecular-weight silicone: Weight-average molecular weight 650,000

Evaluation

With regard to the sheath layers and the optical cables of Nos. 1 to 25, the following items were evaluated.

Density of Sheath Layer

The density of the sheath layer was rated according to the following two levels of A and B on the basis of the value of the density.

A: The density of the sheath layer is 2.0 g/cm$^3$ or less.
B: The density of the sheath layer is more than 2.0 g/cm$^3$.

Elastic Modulus

With regard to the sheath layers of the optical cables of Nos. 1 to 25, an elastic modulus E1 at 25° C. and an elastic modulus E2 at 70° C. were determined in accordance with the test method of dynamic mechanical properties described in JIS-K7244-4 (1999) from storage elastic moduli measured with a viscoelasticity measuring device ("DVA-220" manufactured by IT Keisoku Seigyo Co., Ltd.) in a tensile mode, in a temperature range of from −60° C. to 80° C., at a temperature increasing rate of 5° C./min, at a frequency of 10 Hz, and at a strain of 0.05%. An elastic modulus E1 of 250 MPa or more at 25° C. is rated good. An elastic modulus E2 of 30 MPa or more at 70° C. is rated good because the cable is unlikely to deform even during the storage at high temperature.

Flame Retardancy

Sheet samples were prepared using only the materials of sheath layers, and an oxygen index was evaluated on the basis of JIS-K7201-2 (2007). Flame retardancy was rated according to the following two levels of A and B on the basis of the oxygen index. The evaluation criteria of the flame retardancy were as follows. In the case of A, the result can be evaluated as pass.

A: The oxygen index is 36 or more.
B: The oxygen index is less than 36.

Extrudability

Extrudability of each of the resin composition for forming sheath layers was rated according to the following two levels of A and B on the basis of the state of the resin composition for forming a sheath layer during extrusion. The evaluation criteria of the extrudability were as follows. In the case of A, the result can be evaluated as pass.

A: During extrusion, a silicone separated, near a die, from the resin composition for forming a sheath layer does not deposit.
B: During extrusion, a silicone separated, near a die, from the resin composition for forming a sheath layer adheres to the covering material, and the appearance deteriorates.

Tensile Elongation

A tensile elongation [%] of each of the sheath layers was measured in accordance with JIS-C3005:2014, 4.16. In the case of a tensile elongation of 150% or more, the result can be evaluated as pass because a high effect of suppressing cracking of the jacket during installation into a microduct is provided.

Slidability Based on Coefficient of Kinetic Friction

Sheet samples were prepared by extrusion using only the resin compositions for forming sheath layers of Nos. 1 to 25. Next, the coefficient of kinetic friction of each of the sheet samples was measured in accordance with JIS-K7125:1999. The evaluation criteria of the coefficient of kinetic friction were as follows. In the case of a coefficient of kinetic friction of 0.70 or less, the result can be evaluated as pass.

Blowing Distance of Optical Cable

Figure 2:
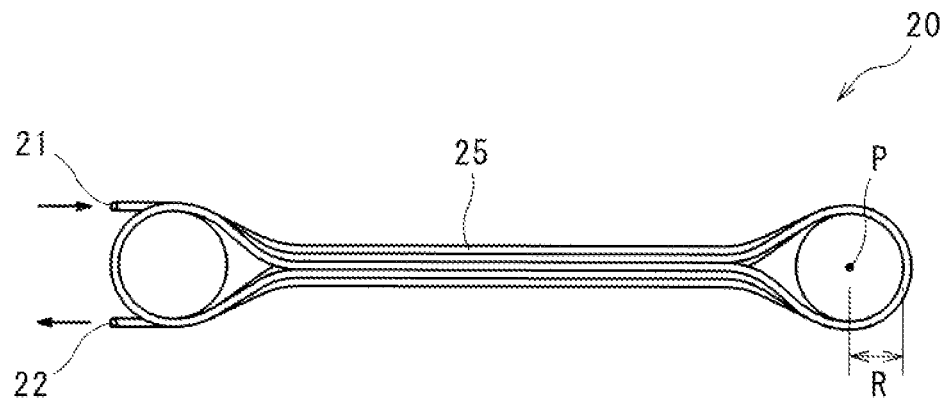
FIG. 2 is a schematic view of blowing equipment used in a microduct blowing test.

The blowing distance of each of the optical cables of Nos. 1 to 25 was determined by conducting a microduct blowing test based on the International Electrotechnical Commission (IEC) standard using blowing equipment 20 illustrated in FIG. 2. A pipe 25 has a total length of 1,000 m and folded back at every 100 m. A radius of curvature R (a radius of the circle of curvature centered at P) of each curved portion in the fold of the pipe 25 is 40 times the outer diameter of the pipe 25. The inner diameter of the pipe 25 is 14 mm. Air and each optical cable were fed from an inlet port 21 of the pipe 25 and taken out from an outlet port 22. The pressure of the air was 1.3 MPa to 1.5 MPa. When the blowing distances of the optical cable is 300 m or more, the air-blowing property of the optical cable can be evaluated as pass.

The evaluation results are shown in Tables 1 and 2.

TABLE 1

| | | | Test No. | | | | | |
|---|---|---|---|---|---|---|---|---|
| | | | 1 | 2 | 3 | 4 | 5 | 6 |
| Sheath layer composition | Olefin-based resin (mass %) | EEA (EA: 18%) | — | 60 | — | — | — | — |
| | | EVA (VA: 35%) | 60 | — | 60 | 60 | 60 | 60 |
| | | LDPE | — | — | — | — | — | — |
| | | HDPE | 30 | 30 | 30 | 30 | 30 | 30 |
| | | Acid-modified PE | 10 | 10 | 10 | 10 | 10 | 10 |
| | Mass ratio of flame retardant to olefin-based resin | Mg hydroxide | 1.50 | 1.50 | — | 1.00 | 2.00 | 1.50 |
| | | Al hydroxide | — | — | 1.50 | — | — | — |
| | | Melamine cyanurate | — | — | — | — | — | — |
| | Mass ratio of lubricant to olefin-based resin | Low-molecular-weight silicone Molecular weight 40,000 | — | — | — | — | — | — |
| | | Low-molecular-weight silicone Molecular weight 70,000 | — | — | — | — | — | — |
| | | High-molecular-weight silicone Molecular weight 650,000 | 0.020 | 0.020 | 0.020 | 0.020 | 0.020 | 0.005 |
| Physical property values of sheath layer | Density of sheath layer [g/cm$^3$] | | 1.5 | 1.5 | 1.5 | 1.3 | 1.8 | 1.5 |
| | Elastic modulus [MPa] | 25° C.: E1 | 480 | 500 | 480 | 480 | 500 | 480 |
| | | 70° C.: E2 | 50 | 55 | 50 | 47 | 53 | 51 |
| Evaluation | Flame retardancy [Oxygen index] | | 40 | 40 | 39 | 37 | 42 | 40 |
| | Extrudability | | A | A | A | A | A | A |
| | Tensile elongation [%] | | 185 | 172 | 180 | 190 | 164 | 184 |
| | Coefficient of kinetic friction | | 0.35 | 0.28 | 0.38 | 0.31 | 0.45 | 0.62 |
| | Blowing distance of optical cable [m] | | 640 | 660 | 620 | 690 | 450 | 360 |

| | | | Test No. | | | | | |
|---|---|---|---|---|---|---|---|---|
| | | | 7 | 8 | 9 | 10 | 11 | 12 |
| Sheath layer composition | Olefin-based resin (mass %) | EEA (EA: 18%) | — | — | — | — | — | — |
| | | EVA (VA: 35%) | 60 | 60 | 30 | 50 | 60 | 60 |
| | | LDPE | — | — | — | — | — | 30 |
| | | HDPE | 30 | 30 | 60 | 30 | 35 | — |
| | | Acid-modified PE | 10 | 10 | 10 | 20 | 5 | 10 |
| | Mass ratio of flame retardant to olefin-based resin | Mg hydroxide | 1.50 | 1.50 | 1.50 | 1.50 | 1.50 | 1.50 |
| | | Al hydroxide | — | — | — | — | — | — |
| | | Melamine cyanurate | — | — | — | — | — | — |
| | Mass ratio of lubricant to olefin-based resin | Low-molecular-weight silicone Molecular weight 40,000 | — | — | — | — | — | — |
| | | Low-molecular-weight silicone Molecular weight 70,000 | — | 0.020 | — | — | — | — |
| | | High-molecular-weight silicone Molecular weight 650,000 | 0.100 | — | 0.020 | 0.020 | 0.020 | 0.020 |
| Physical property values of sheath layer | Density of sheath layer [g/cm$^3$] | | 1.5 | 1.5 | 1.5 | 1.5 | 1.5 | 1.5 |
| | Elastic modulus [MPa] | 25° C.: E1 | 480 | 480 | 600 | 260 | 530 | 380 |
| | | 70° C.: E2 | 50 | 50 | 70 | 35 | 65 | 35 |
| Evaluation | Flame retardancy [Oxygen index] | | 40 | 40 | 36 | 40 | 39 | 40 |
| | Extrudability | | A | A | A | A | A | A |
| | Tensile elongation [%] | | 172 | 156 | 160 | 197 | 152 | 184 |
| | Coefficient of kinetic friction | | 0.25 | 0.18 | 0.24 | 0.52 | 0.35 | 0.52 |
| | Blowing distance of optical cable [m] | | 800 | 850 | 810 | 540 | 680 | 310 |

TABLE 2

| | | | Test No. | | | | | | |
|---|---|---|---|---|---|---|---|---|---|
| | | | 13 | 14 | 15 | 16 | 17 | 18 | 19 |
| Sheath layer composition | Olefin-based resin (mass %) | EEA (EA: 18%) | — | — | — | — | — | — | — |
| | | EVA (VA: 35%) | 65 | 25 | 30 | 60 | 45 | 60 | 60 |
| | | LDPE | — | — | — | — | — | — | — |
| | | HDPE | 30 | 60 | 65 | 25 | 30 | 37 | 30 |
| | | Acid-modified PE | 5 | 15 | 5 | 15 | 25 | 3 | 10 |
| | Mass ratio of flame retardant to olefin-based resin | Mg hydroxide | 1.50 | 1.50 | 1.50 | 1.50 | 1.50 | 1.50 | — |
| | | Al hydroxide | — | — | — | — | — | — | — |
| | | Melamine cyanurate | — | — | — | — | — | — | 0.90 |

TABLE 2-continued

| | | | | | | | | | |
|---|---|---|---|---|---|---|---|---|---|
| | Mass ratio of lubricant to olefin-based resin | Low-molecular-weight silicone Molecular weight 40,000 | — | — | — | — | — | — | — |
| | | Low-molecular-weight silicone Molecular weight 70,000 | — | — | — | — | — | — | — |
| | | High-molecular-weight silicone Molecular weight 650,000 | 0.020 | 0.020 | 0.020 | 0.020 | 0.020 | 0.020 | 0.020 |
| Physical property values of sheath layer Evaluation | Density of sheath layer [g/cm³] | | 1.5 | 1.5 | 1.5 | 1.5 | 1.5 | 1.5 | 1.3 |
| | Elastic modulus [MPa] | 25° C.: E1 | 450 | 600 | 650 | 320 | 280 | 480 | 450 |
| | | 70° C.: E2 | 30 | 70 | 72 | 30 | 30 | 55 | 50 |
| | Flame retardancy [Oxygen index] | | 40 | 38 | 40 | 40 | 40 | 40 | 37 |
| | Extrudability | | A | A | A | A | A | A | A |
| | Tensile elongation [%] | | 190 | 155 | 150 | 190 | 210 | 160 | 180 |
| | Coefficient of kinetic friction | | 0.41 | 0.22 | 0.20 | 0.40 | 0.45 | 0.33 | 0.25 |
| | Blowing distance of optical cable [m] | | 615 | 830 | 840 | 580 | 500 | 680 | 850 |

| | | | Test No. | | | | | |
|---|---|---|---|---|---|---|---|---|
| | | | 20 | 21 | 22 | 23 | 24 | 25 |
| Sheath layer composition | Olefin-based resin (mass %) | EEA (EA: 18%) | — | — | — | — | — | — |
| | | EVA (VA: 35%) | 60 | 60 | 60 | 60 | 60 | 60 |
| | | LDPE | — | — | — | — | — | — |
| | | HDPE | 40 | 30 | 30 | 30 | 30 | 30 |
| | | Acid-modified PE | — | 10 | 10 | 10 | 10 | 10 |
| | Mass ratio of flame retardant to olefin-based resin | Mg hydroxide | 1.50 | 0.40 | 2.30 | 1.50 | 1.50 | 1.50 |
| | | Al hydroxide | — | — | — | — | — | — |
| | | Melamine cyanurate | — | — | — | — | — | — |
| | Mass ratio of lubricant to olefin-based resin | Low-molecular-weight silicone Molecular weight 40,000 | — | — | — | 0.020 | — | — |
| | | Low-molecular-weight silicone Molecular weight 70,000 | — | — | — | — | — | — |
| | | High-molecular-weight silicone Molecular weight 650,000 | 0.020 | 0.020 | 0.020 | — | 0.003 | 0.120 |
| Physical property values of sheath layer Evaluation | Density of sheath layer [g/cm³] | | 1.5 | 1.1 | 2.2 | 1.5 | 1.5 | 1.5 |
| | Elastic modulus [MPa] | 25° C.: E1 | 460 | 450 | 600 | 440 | 440 | 440 |
| | | 70° C.: E2 | 60 | 50 | 70 | 40 | 40 | 40 |
| | Flame retardancy [Oxygen index] | | 36 | 34 | 45 | 40 | 40 | 40 |
| | Extrudability | | A | A | A | B | A | B |
| | Tensile elongation [%] | | 150 | 200 | 140 | 180 | 180 | 175 |
| | Coefficient of kinetic friction | | 0.22 | 0.35 | 0.60 | 0.22 | 0.78 | 0.15 |
| | Blowing distance of optical cable [m] | | 800 | 780 | 280 | 800 | 260 | 900 |

As shown in Tables 1 and 2, in Nos. 1 to 20, in which the sheath layer had a density of 2.0 g/cm³ or less, the sheath layer contained an olefin-based resin, a silicone, and a non-halogen flame retardant, the mass ratio of the non-halogen flame retardant to the olefin-based resin was 0.90 to 2.00, the mass ratio of the silicone to the olefin-based resin was 0.005 to 0.100, the olefin-based resin contained a polyethylene, and an ethylene-vinyl acetate copolymer or an ethylene-ethyl acrylate copolymer, and the silicone had a weight-average molecular weight of 50,000 to 1,000,000, the elastic modulus at 25° C. and the elastic modulus at 70° C. in the sheath layer were in the satisfactory ranges, and good results were obtained in all the flame retardancy, extrudability, tensile elongation, coefficient of kinetic friction, and blowing distance of the optical cable.

On the other hand, No. 21, in which the mass ratio of the non-halogen flame retardant to the olefin-based resin was less than 0.90, had poor flame retardancy. No. 22, in which the mass ratio of the non-halogen flame retardant to the olefin-based resin exceeded 2.00, had a high density of the sheath layer and had a poor tensile elongation and a poor blowing distance of the optical cable. No. 23, in which the silicone had a weight-average molecular weight of less than 50,000, and No. 25, in which the mass ratio of the silicone to the olefin-based resin exceeded 0.100, had poor extrudability. No. 24, in which the mass ratio of the silicone to the olefin-based resin was less than 0.005, had poor slidability and a poor blowing distance of the optical cable.

The above results showed that the optical cables had high flame retardancy and had good air-blowing performances into microducts due to improvements in the hardness of the sheath layer, the slidability of the surface of the sheath layer, and the reduction in weight of the sheath layer. The optical cables can be suitable for use as, for example, optical cables for microducts between data centers in which a large amount of information is transmitted and between floors of such data centers.

What is claimed is:

1. An optical cable for installation in a microduct, the optical cable comprising:
   one or more optical-fiber core wires; and
   a sheath layer covering an outer peripheral side of the one or more optical-fiber core wires,
   wherein the sheath layer has a density of 2.0 g/cm³ or less, the sheath layer contains an olefin-based resin, a silicone, and a non-halogen flame retardant,
   a mass ratio of the non-halogen flame retardant to the olefin-based resin is 0.90 to 2.00,
   a mass ratio of the silicone to the olefin-based resin is 0.005 to 0.100,
   the olefin-based resin contains a polyethylene, and an ethylene-vinyl acetate copolymer or an ethylene-ethyl acrylate copolymer, and the silicone has a weight-average molecular weight of 50,000 to 1,000,000.

2. The optical cable according to claim 1,
wherein a content of the polyethylene in the olefin-based resin is 30% by mass to 60% by mass,
a content of the ethylene-vinyl acetate copolymer or the ethylene-ethyl acrylate copolymer in the olefin-based resin is 30% by mass to 60% by mass, and
the polyethylene has a density of 0.92 g/cm$^3$ or more.

3. The optical cable according to claim 1, wherein the sheath layer has an elastic modulus of 250 MPa to 2,000 MPa at 25° C.

4. The optical cable according to claim 1, wherein the sheath layer has an elastic modulus of 30 MPa or more at 70° C.

5. The optical cable according to claim 1, wherein the polyethylene is a high-density polyethylene.

6. The optical cable according to claim 1,
wherein the olefin-based resin further contains an acid-modified polyethylene, and
a content of the acid-modified polyethylene in the olefin-based resin is 5% by mass to 20% by mass.

* * * * *